(12) United States Patent
Essinger et al.

(10) Patent No.: US 10,442,528 B2
(45) Date of Patent: Oct. 15, 2019

(54) WHEEL DRIVE SYSTEM, IN PARTICULAR FOR AN AIRCRAFT

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Olivier Essinger, Clermont-Ferrand (FR); Patrick Marro, Clermont-Ferrand (FR); Claude Blanc, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 363 days.

(21) Appl. No.: 15/318,137

(22) PCT Filed: Jun. 30, 2015

(86) PCT No.: PCT/EP2015/064782
§ 371 (c)(1),
(2) Date: Dec. 12, 2016

(87) PCT Pub. No.: WO2016/001192
PCT Pub. Date: Jan. 7, 2016

(65) Prior Publication Data
US 2017/0129594 A1 May 11, 2017

(30) Foreign Application Priority Data
Jun. 30, 2014 (FR) .................................. 14 56209

(51) Int. Cl.
*B64C 25/40* (2006.01)
*B64C 25/34* (2006.01)
(Continued)

(52) U.S. Cl.
CPC ............ *B64C 25/405* (2013.01); *B64C 25/34* (2013.01); *B64C 25/40* (2013.01); *B64C 25/58* (2013.01); *B64C 25/64* (2013.01); *Y02T 50/823* (2013.01)

(58) Field of Classification Search
CPC ....... B64C 25/405; B64C 25/34; B64C 25/58; B64C 25/40; B64C 25/64
See application file for complete search history.

(56) References Cited

U.S. PATENT DOCUMENTS

| 1,642,645 A | 9/1927 | Constantinesco |
|---|---|---|
| 1,952,434 A | 3/1934 | Hartsock |
| (Continued) | | |

FOREIGN PATENT DOCUMENTS

| EP | 2 527 249 A1 | 11/2012 |
|---|---|---|
| FR | 2 954 236 A1 | 6/2011 |
| (Continued) | | |

OTHER PUBLICATIONS

Translation for FR-2954236-A1T (Year: 2011).*
Jul. 27, 2015 International Search Report and Written Opinion in International Patent Appln. No. PCT/EP2015/064782.

*Primary Examiner* — Richard R. Green
*Assistant Examiner* — Steven J Shur
(74) *Attorney, Agent, or Firm* — Venable LLP

(57) ABSTRACT

A wheel drive system for ground movement of an aircraft includes a motor system and a clutch system. The motor system, which is borne by an unsuspended part of a landing gear strut of the aircraft, includes an electric motor and a reduction gearing system. The clutch system, which connects an output shaft of the electric motor to a wheel of the aircraft via the reduction gearing system, includes a dog-clutch and a translational movement system. The dog-clutch includes a drive part, which is secured to the motor system, and a receiving part, which secures to a tire of the wheel. The (Continued)

translational movement system moves the drive part along an axis of an axle crossbeam of the landing gear strut into an engaged position, in which the drive part collaborates with the receiving part, and a disengaged position, in which the drive part is separated from the receiving part.

14 Claims, 10 Drawing Sheets

(51) Int. Cl.
*B64C 25/58* (2006.01)
*B64C 25/64* (2006.01)

(56) References Cited

U.S. PATENT DOCUMENTS

| | | | |
|---|---|---|---|
| 2,069,558 A | 2/1937 | Rauen et al. | |
| 2,672,308 A * | 3/1954 | Farrell | B64C 25/40 123/183.1 |
| 4,659,039 A | 4/1987 | Valdes | 244/103.5 |
| 8,684,300 B2 * | 4/2014 | Wilson | B64C 25/405 244/50 |
| 8,794,092 B2 | 8/2014 | Tizac | 74/354 |
| 8,857,544 B2 | 10/2014 | Essinger et al. | 180/65.51 |
| 9,475,546 B2 | 10/2016 | Olsommer et al. | B62M 6/75 |
| 9,533,734 B2 | 1/2017 | Olsommer et al. | B62M 6/75 |
| 9,550,564 B2 * | 1/2017 | Christensen | B64C 25/405 |
| 2011/0156472 A1 | 6/2011 | Bucheton et al. | 301/6.2 |
| 2012/0217340 A1 | 8/2012 | Essinger et al. | 244/50 |
| 2012/0305702 A1 | 12/2012 | Bucheton et al. | 244/101 |
| 2013/0256452 A1 * | 10/2013 | Ushiyama | B64C 25/40 244/50 |
| 2015/0314862 A1 | 11/2015 | Blanc et al. | B64C 25/405 |
| 2017/0113788 A1 | 4/2017 | Essinger et al. | |

FOREIGN PATENT DOCUMENTS

| | | | | |
|---|---|---|---|---|
| FR | 2954236 A1 * | 6/2011 | | B60K 7/0007 |
| FR | 2 972 389 A1 | 9/2012 | | |
| FR | 2 975 340 A1 | 11/2012 | | |
| WO | WO 2011/073587 A1 | 6/2011 | | |
| WO | WO 2011/073590 A1 | 6/2011 | | |
| WO | WO-2014001757 A1 * | 1/2014 | | B64C 25/405 |
| WO | WO-2014023941 A1 * | 2/2014 | | B64C 25/405 |

* cited by examiner

WHEEL DRIVE SYSTEM, IN PARTICULAR FOR AN AIRCRAFT

FIELD OF THE INVENTION

The present invention relates to the field of aircraft and notably the systems for driving a wheel when the aircraft is moving around on the ground.

RELATED ART

A distinction is generally made between a number of phases in which an aircraft is moving around on the ground prior to the phase of take-off or after the phase of landing: a phase of moving around at very low speed, for example less than 5 km/h, commonly referred to as the "manoeuvring phase" aimed at moving the aircraft from a parking/storage location to a loading zone, and a phase of moving around in forward gear at low speed, for example of the order of 20 km/h, more commonly and universally known by its English name of "taxiing". The manoeuvring phase may include movement in reverse gear, for example in order to exit a building such as a storage hangar and/or moving around in forward gear in order to reach a loading zone. The movements during the manoeuvring phase are performed at very low speed, generally with assistance from individuals on the ground outside the aircraft.

The phase of manoeuvring in reverse gear and/or in forward gear at very low speed is generally performed using a motor vehicle able to steer the aircraft, such as, for example, a dedicated tractor more commonly referred to by its English name of "tug".

One solution is to associate an electric motor with the aircraft wheel. However, permanent connection between the wheel and the motor means that the electric motor has to rapidly reach a high rotational speed during a high-speed landing, for example at 220 km/h, and that entails the use of an electric motor capable of withstanding such a speed. In addition, because of the permanent connection between the wheel and the motor, the wheel may become locked if the electric motor or the transmission means become blocked.

Furthermore, such systems do not provide the ability to withstand deformations of the suspension strut and of the wheel, notably during the various phases of manoeuvring and/or taxiing on the ground, such as the aircraft executing turns and/or braking.

Reference may be made to document FR 2 975 340 which describes a device for the rotational coupling of an output gearwheel of a reduction gearset to a wheel of an aircraft comprising a plurality of link rods forming ball-jointed connections with the rim of the wheel and the output gearwheel respectively.

However, such a coupling device does not allow the drive system to adopt a disengaged position in which the motor unit is uncoupled from the wheel, which means that during phases of high-speed running, such as, for example, when the aircraft is landing, the electric motor needs to be capable of withstanding such a speed.

Reference may to made to document EP 2 527 249 which describes a disengageable interface mechanism for the interface between a wheel drive system of an aeroplane landing gear and a wheel comprising a geared motor unit and a clutch system within the geared motor unit. The interface mechanism comprises a rotary part rotationally driven by the geared motor unit and a fixed part secured to the rim and permanently engaging with the rotary part. The coupling between the geared motor unit and the wheel is achieved by the intermeshing of one of the intermediate pinions of the geared motor unit and a gearwheel by virtue of systems that block the rotation of the intermediate pinions borne by a pendular element articulated about the axis of rotation of the drive pinion and adjustable end stops that adjust the angular travel of the pendular element.

However, such a pivoting system is particularly complex and is likewise unable to withstand deformations between the suspension strut and the wheel. In addition, such a system entails permanent collaboration between the rotary part of the interface mechanism and the rim of the wheel.

Reference may be made to document WO 2011/073590 which proposes an autonomous drive system for an aircraft wheel comprising a motor unit connected in pivoting fashion to a non-suspended part of a suspension strut, a drive member, such as a ring gear, secured to the rim of the wheel and a clutch device borne by the suspension strut and allowing the output shaft of the motor unit to be connected to the drive member. The clutch system allows the motor unit and the wheel to be engaged or disengaged. The motor unit is able to move with respect to the wheel via the drive member into an engaged position during movement on the ground at low speed and disengaged during landing or take-off. In order to compensate for deformations of the landing gear, a constant-velocity joint is positioned between the output pinion of the motor unit and the output shaft of the motor unit supporting the output pinion.

However, such a system is complex to produce and entails the use of a plurality of link rods rotationally mounted on the non-suspended part of the suspension strut and on the motor unit.

BRIEF DESCRIPTION OF EMBODIMENTS OF THE INVENTION

It is therefore an object of the present invention to overcome these disadvantages.

More specifically, the present invention seeks to provide a wheel drive system incorporated into the landing gear and allowing the aircraft to be moved around during the manoeuvring phase and during the taxiing phase, while at the same time affording protection to the drive system, for example during landing, take-off and aircraft movements at high speed.

Another objective of the present invention is to allow the drive system to withstand the deformations of the suspension strut and of the wheel, notably during the various phases of manoeuvring on the ground and of taxiing, such as when the aircraft is executing turns and/or braking.

One subject of the invention is a wheel drive system, for the ground circulation of an aircraft, comprising a motor unit borne by an unsuspended part of a landing gear strut of the aircraft and comprising an electric motor and reduction means. The wheel drive system further comprises a clutch device connecting the output shaft of the electric motor to the wheel via the reduction means.

The clutch device comprises a dog-clutch mechanism comprising a drive part secured to the motor unit and a receiving part secured to the tire of the wheel, and a system for the translational movement, along the axis of the axle crossbeam of the landing gear strut, of the drive part into an engaged position in which the drive part collaborates with the receiving part and a disengaged position in which the drive part is separated from the receiving part.

Such a drive system is secured to the landing gear and more specifically to the axle crossbeam that bears the wheel. It is therefore carried directly on board the aircraft.

In one embodiment, the receiving part comprises a plurality of shock-absorbing pads projecting axially towards the drive part. The shock-absorbing pads are secured to one of the lateral sidewalls of the tire and spaced apart in such a way as to leave a space between two adjacent shock-absorbing pads.

The shock-absorbing pads are, for example made of a rubbery material and overmoulded directly onto the lateral sidewall of the tire.

The shock-absorbing pads may be made from a material that differs from the material used for the tire, notably in the region of the lateral sidewalls. For example, the shock-absorbing pads are made from a material that has a hardness of 35 Shore A.

In one embodiment, the drive part comprises an annular part or annulus fixed to the motor unit and a plurality of coupling fingers or dogs fixed uniformly around the circumference of the annulus and intended to engage, when the wheel drive system is in the engaged position, in a respective square-edged slot between two adjacent shock-absorbing pads of the receiving part.

In one embodiment, the translational movement system comprises a connecting piece secured to the reduction gearbox of the motor unit and mounted on the axle crossbeam of the landing gear strut.

The connecting piece may be mounted on two guide pins secured to the landing gear strut, notably the axle crossbeam.

By way of nonlimiting example, one of the two guide pins may be cylindrical and the second guide pin parallel to the first may have a shape having two planar surfaces oriented judiciously so as to avoid a statically indeterminate construction and withstand potential dimensional, notably thermal, variations better.

In one embodiment, the system for moving the clutch device comprises an electric actuator fixed to the landing gear strut, notably on the axle crossbeam, and comprising an actuator rod mounted via a sliding connection in the actuator and one end of which is fixed to the connecting piece.

The clutch device may comprise means for unblocking and blocking translational movement, allowing the wheel drive system to be kept in a disengaged position. The translational unblocking and blocking means may be electrically operable. The translational blocking may come into effect through a lack of current and via the use of a spring.

The means for unblocking and blocking translational movement for example comprise an actuating cylinder, secured to the connecting piece, comprising a piston, that is actuated by an electromagnet, a first end of which is connected to the actuating cylinder body by a compression spring and a second end of which is intended to engage in a corresponding housing on one of the guide pins when the wheel drive system is in the non-engaged position of rest.

In one embodiment, the reduction means comprise a drive pinion connected to the output shaft of the electric motor, a planetary reduction gearset, for example with at least two reduction stages, rotationally driven by the drive pinion and driving a large-diameter, reduction gearset output bevel annulus gear via a reduction gearset output bevel pinion. The reduction gearset output bevel pinion thus meshes with the reduction gearset output bevel annulus gear, allowing an angular transmission, for example through 100°.

The drive part of the clutch device may be secured, permanently, to the last reduction stage of the reduction means, such as, for example, the reduction gearset output bevel annulus gear. Thus, the clutch device is external to the motor unit.

The supply of power to the electric motor of the drive system, and to the system for moving and the means that unblock and block the translational movement of the drive part in a non-engaged position of rest may come from a power source present on the aircraft, such as an on-board battery, or from an auxiliary generator onboard the aircraft.

According to a second aspect, the invention relates to an aircraft comprising at least one wheel provided with a wheel drive system as described hereinabove.

In one embodiment, the aircraft comprises at least one landing gear provided with two wheels at least one of which wheels is provided with a wheel drive system as described hereinabove.

BRIEF DESCRIPTION OF THE DRAWINGS

Further objects, features and advantages of the invention will become apparent from reading the following description, given solely by way of nonlimiting example and made with reference to the attached drawings in which.

Figure 1:
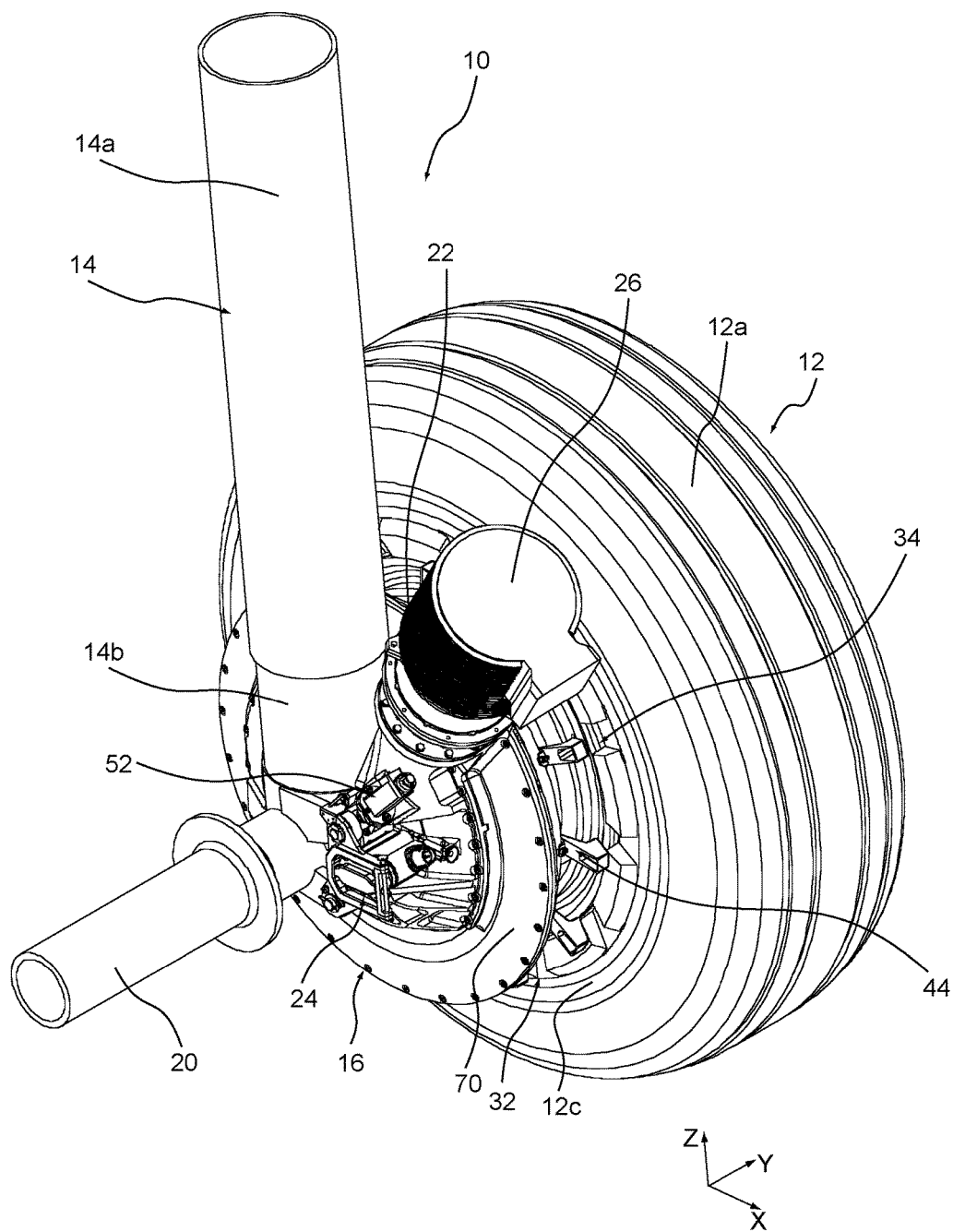
FIG. 1 depicts a perspective view of part of a landing gear of an aircraft equipped with two wheels and with a wheel drive system according to the invention.

In what follows of the description, the terms "longitudinal", "transverse", "vertical", "front", "rear", "left" and "right" are to be understood in relation to the usual orthogonal frame of reference of aircraft, depicted in FIG. 1 and comprising:

a longitudinal axis X, which is horizontal and directed from the front towards the rear of the aircraft;

a transverse axis Y, which is horizontal and perpendicular to the axis X and directed from right to left of the aircraft moving forward;

an axis Z, orthogonal to the axes X and Y and vertical, directed from the bottom upward.

DETAILED DESCRIPTION OF EMBODIMENTS OF THE INVENTION

Figure 10:
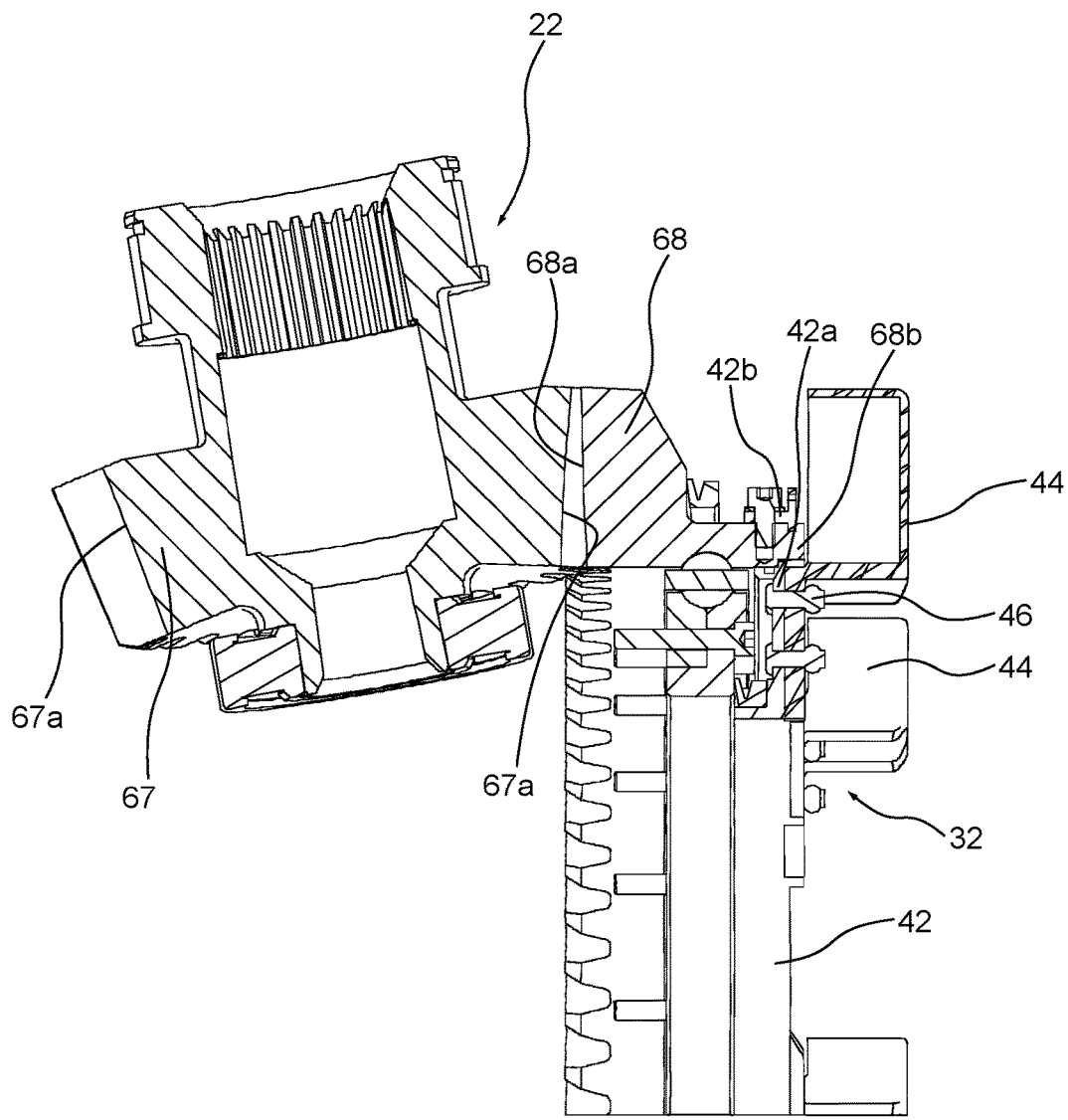
FIG. 10 depicts a view in section showing in detail how the drive part is fixed to the motor unit.

As illustrated in FIG. 1, part of a landing gear of an aircraft, which may for example be a fleet airliner, referenced 10 overall, comprises two wheels 12, just one of which has been depicted in the drawings, a landing gear strut 14, supporting the wheels 12, a drive system 16 for driving one of the two wheels 12 so that the aircraft can move around on the ground, and a braking system 18 associated with each of the wheels, visible in detail in FIG. 10. By way of nonlimiting example, the landing gear may be one of the main landing gears of an aircraft comprising two main landing gears.

The landing gear strut 14 comprises a suspended part 14a connected to the structure of the aircraft and enabling absorption of the energy of the impact of landing and movements around on the ground while at the same time affording the passengers onboard the aircraft the maximum level of comfort, and a non-suspended part 14b connected to the suspended part and comprising an axle crossbeam 20 extending along the horizontal axis Y of the aircraft.

The two wheels 12 each comprise a tire 12a and a rim 12b inserted in the tire and mounted to rotate on the axle crossbeam 20 that acts as a steering knuckle, via rolling bearings (which have not been depicted).

The wheel drive system 16 is borne by the non-suspended part 14b of the landing gear strut 14 and comprises a motor unit 22 and a clutch device 24 which is intended to couple and uncouple the output shaft of the motor with respect to one of the wheels 12.

The motor unit 22 comprises an electric motor 26, such as, for example, a permanent-magnet three-phase synchronous motor, and reduction means which will be described in detail with reference to FIG. 10. The reduction means are housed in a reduction gearbox 28 secured to a connecting piece 30 used for connection to the axle crossbeam 20 of the landing gear strut 14.

The clutch device 24 comprises a dog-clutch mechanism comprising a drive part 32 secured to the motor unit 22 and a receiving part 34 secured to the wheel 12, notably to the tire 12a.

Figure 2:
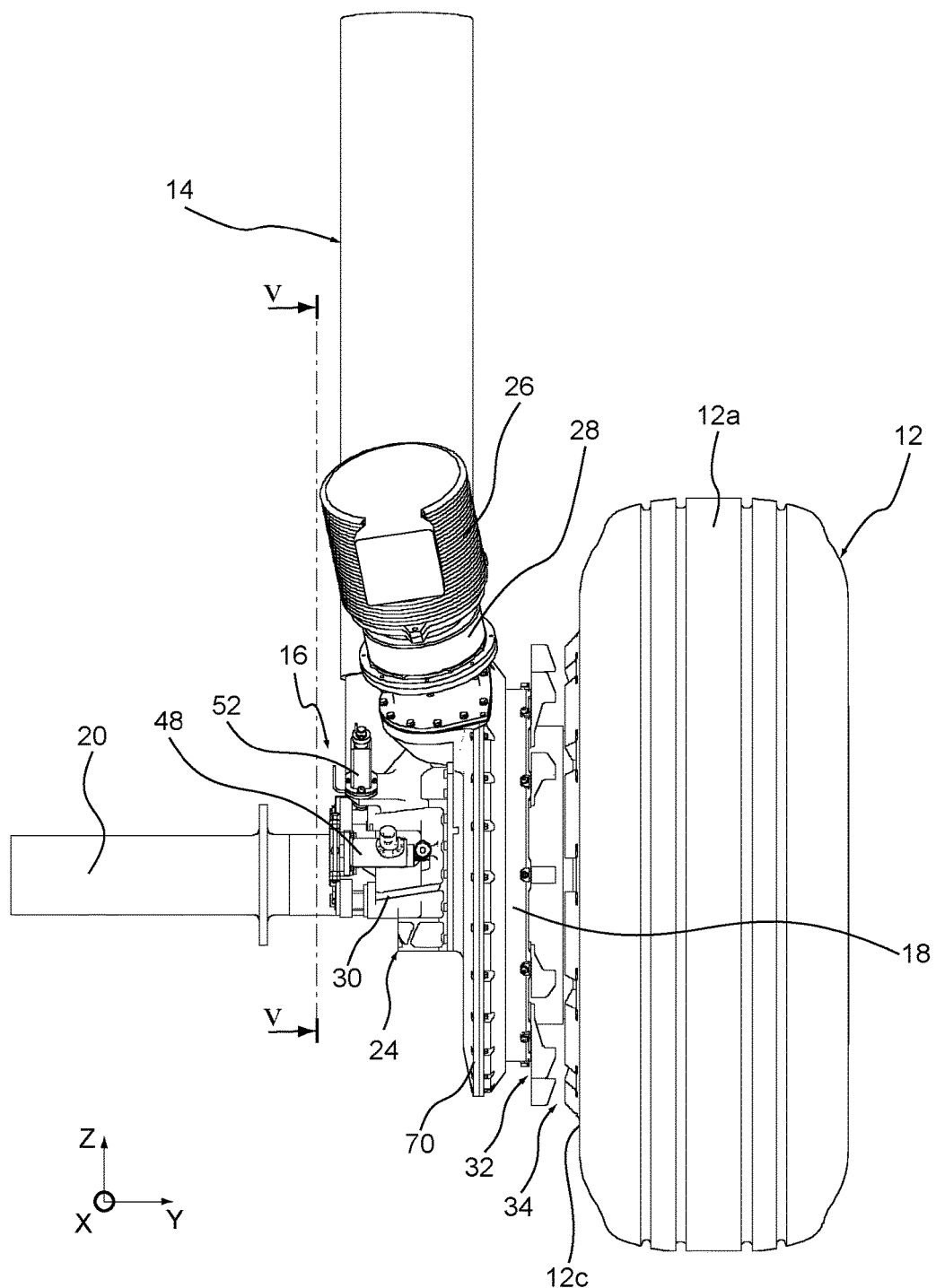
FIGS. 2 and 3 depict a rear view of part of a landing gear according to FIG. 1, illustrating the wheel drive system in a position in which it is disengaged from the wheel and in a position in which it is engaged with the wheel, respectively.
Figure 3:
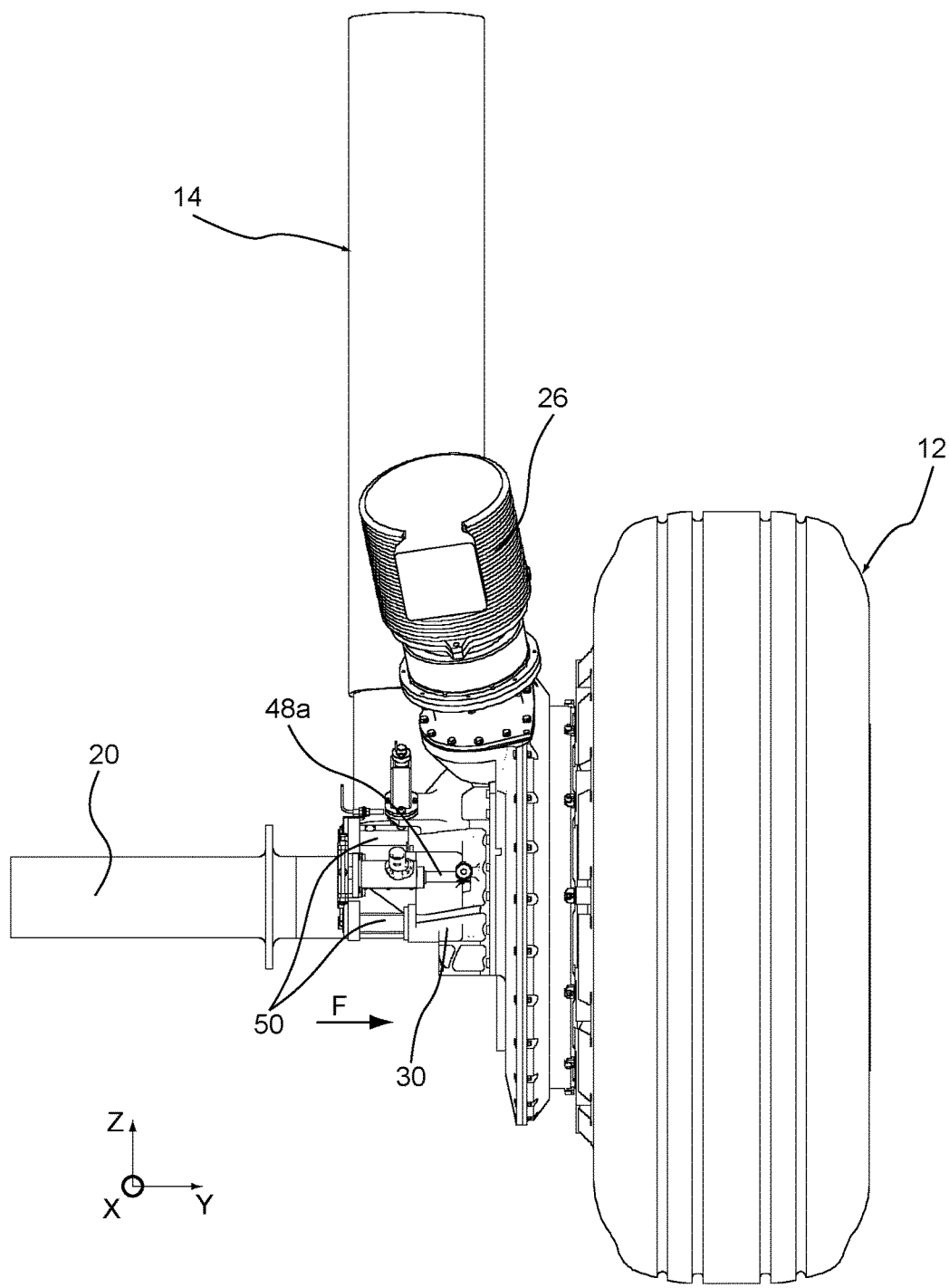

The clutch device 24 further comprises a system for the translational movement, along the axis of the axle crossbeam 20 of the landing gear strut 14, of the drive part 32 into a disengaged or declutched position, visible in FIG. 2, in which the drive part 32 is separated from the receiving part 34 and an engaged or clutch-engaged position, visible in FIG. 3, in which the drive part 32 collaborates with the receiving part 34.

Figure 4:
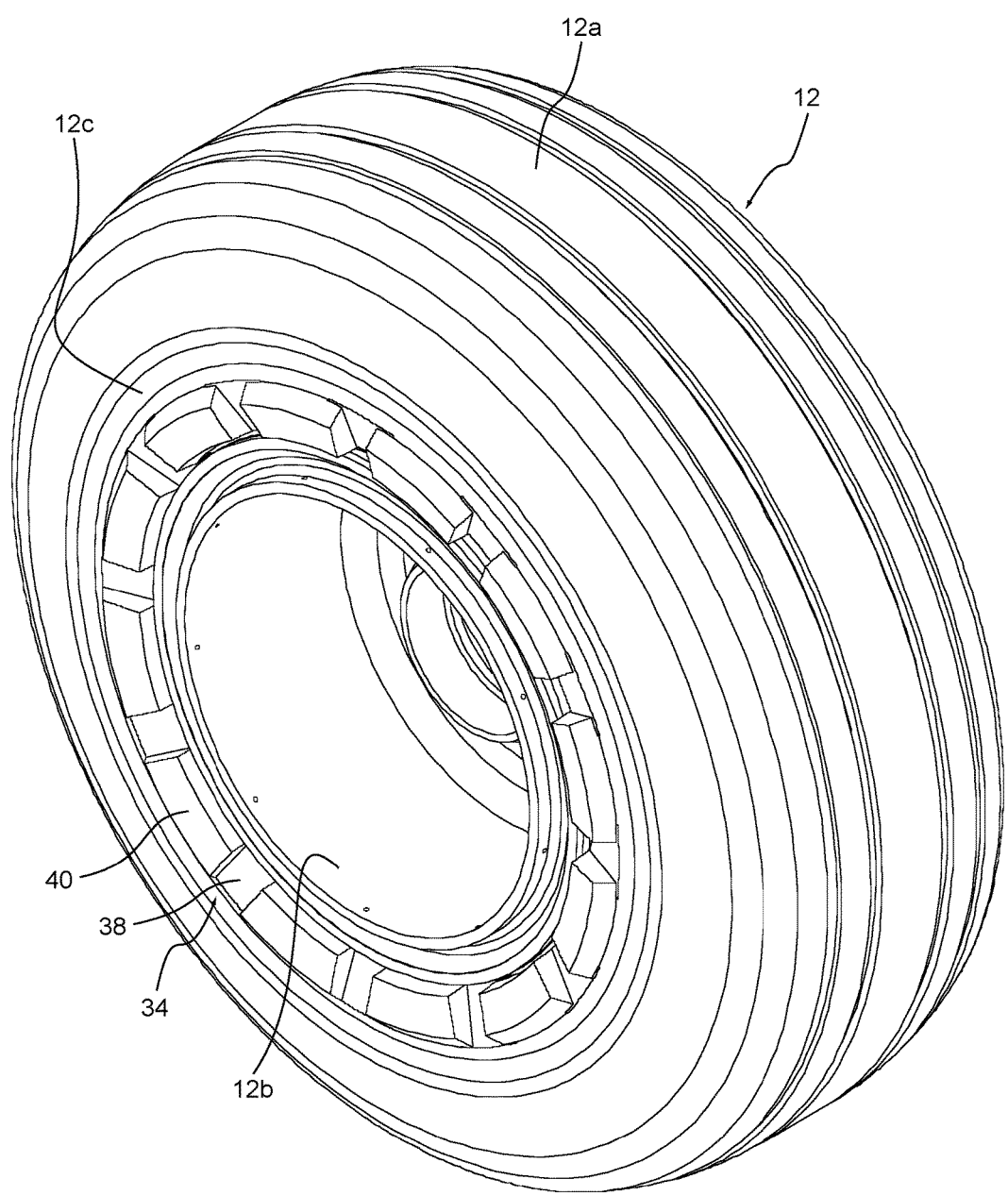
FIG. 4 depicts a perspective view of a driven wheel.

As illustrated in detail in FIG. 4, the receiving part 34 comprises a plurality of shock-absorbing pads 40, of parallelepipedal overall shape, arranged uniformly on one of the lateral sidewalls 12c of the tire, leaving a space or square-edged slot 38 between two adjacent shock-absorbing pads 40.

The shock-absorbing pads take the form of projections extending axially from one of the lateral sidewalls 12c of the tire 12a towards the drive part 32.

As illustrated, the shock-absorbing pads 40 are overmoulded directly on the lateral sidewall 12c. The shock-absorbing pads may be made from a material that differs from the material used for the tire, notably in terms of hardness, so as to transmit the rotation torque to the wheel by contact with the drive part 32.

Specifically, the lateral sidewalls of a tire are generally made from a rubber that is soft so as to tolerate the deformations on each revolution of the wheel while at the same time being resistant to impact. The shock-absorbing pads 40 need to have a greater hardness than the rubber used for the lateral sidewalls. By way of nonlimiting example, the shock-absorbing pads may be made from a rubbery material having a hardness of 35 Shore A.

As illustrated in detail in FIG. 10, the drive part 32 comprises an annulus 42 fixed to the motor unit 22 and a plurality of coupling fingers 44 or dogs fixed uniformly to the circumference of the annulus 42, by fixing means 46, for example screw-fasteners. Each coupling finger 44 comprises a fixing part (unreferenced) for fixing to the annulus 42 and a part (unreferenced) projecting axially along the horizontal axis Y towards the receiving part 34 and projecting radially towards the outside of the drive part 32. The coupling fingers 44 are intended to engage, when the system that drives the wheel 12 is in the engaged position, in a respective square-edged slot 38 between two adjacent shock-absorbing pads 40 of the receiving part 34. The coupling fingers are made of a metallic material, such as steel for example.

The rotation of the electric motor 26 is transmitted by contact between the coupling fingers 44 and the shock-absorbing pads 40. Specifically, as the electric motor 26 turns, each coupling finger 44 presses against one side of a shock-absorbing pad which drives the wheel 12 in rotation.

The compression of the shock-absorbing pads 40 and the sliding of the fingers 44 make it possible to absorb deformations between the wheel 12 and the landing gear strut 14. Specifically, the deformation of the shock-absorbing pads 40 tolerates the deformations of the landing gear 10 and of the wheel 12.

It is necessary to provide square-edged slots 38 that are large enough in the circumferential direction that they can accept the coupling fingers 44 even when the deformations of the landing gear 10 are significant.

Figure 5:
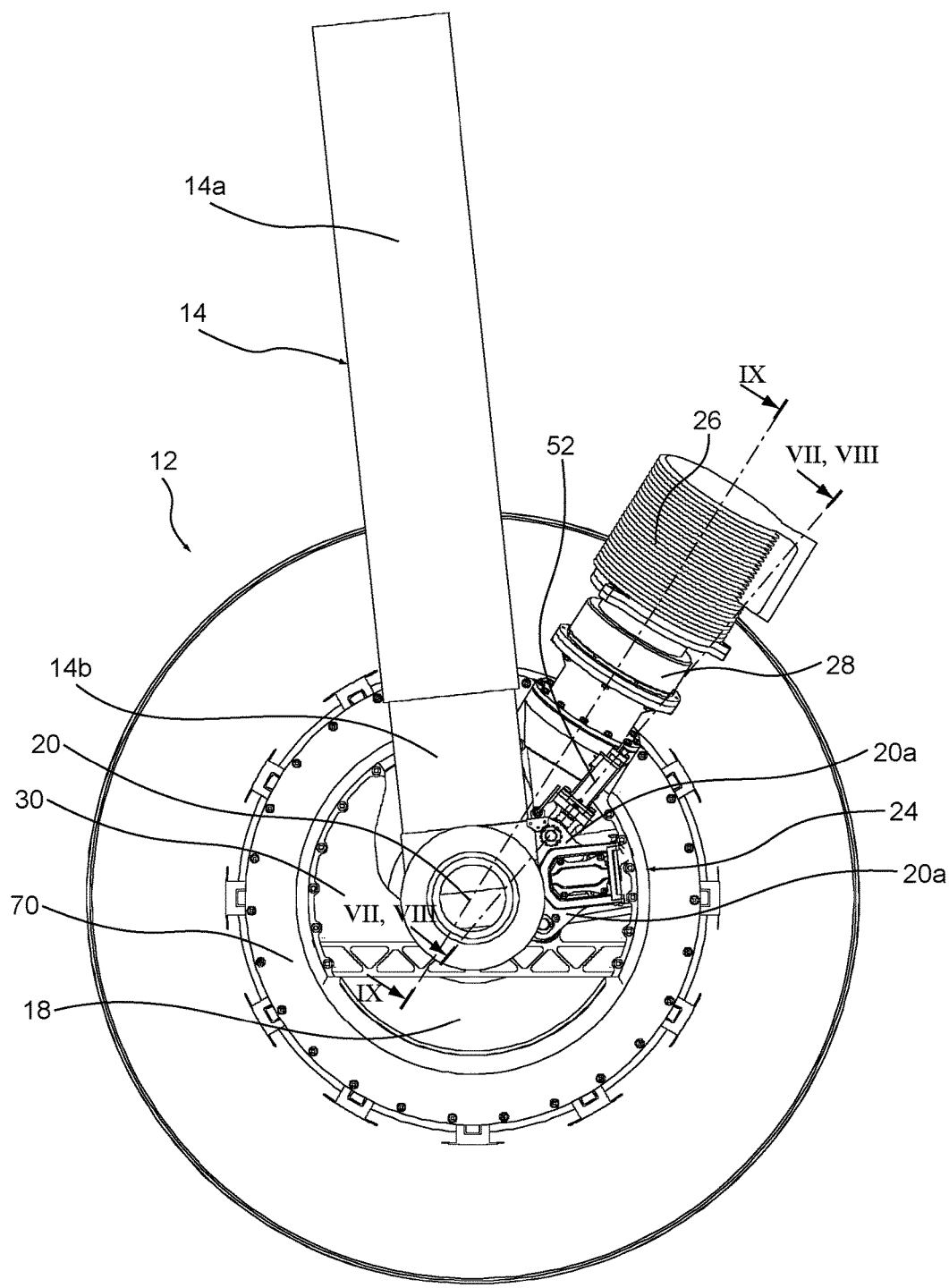
FIG. 5 depicts a view in section V-V according to FIG. 2.

The connecting piece 30 fixed to the axle crossbeam 20 of the landing gear strut 14, which is visible in detail in FIG. 5, in a nonlimiting manner has a partially circular particular shape in order notably to minimize its weight.

Figure 6:
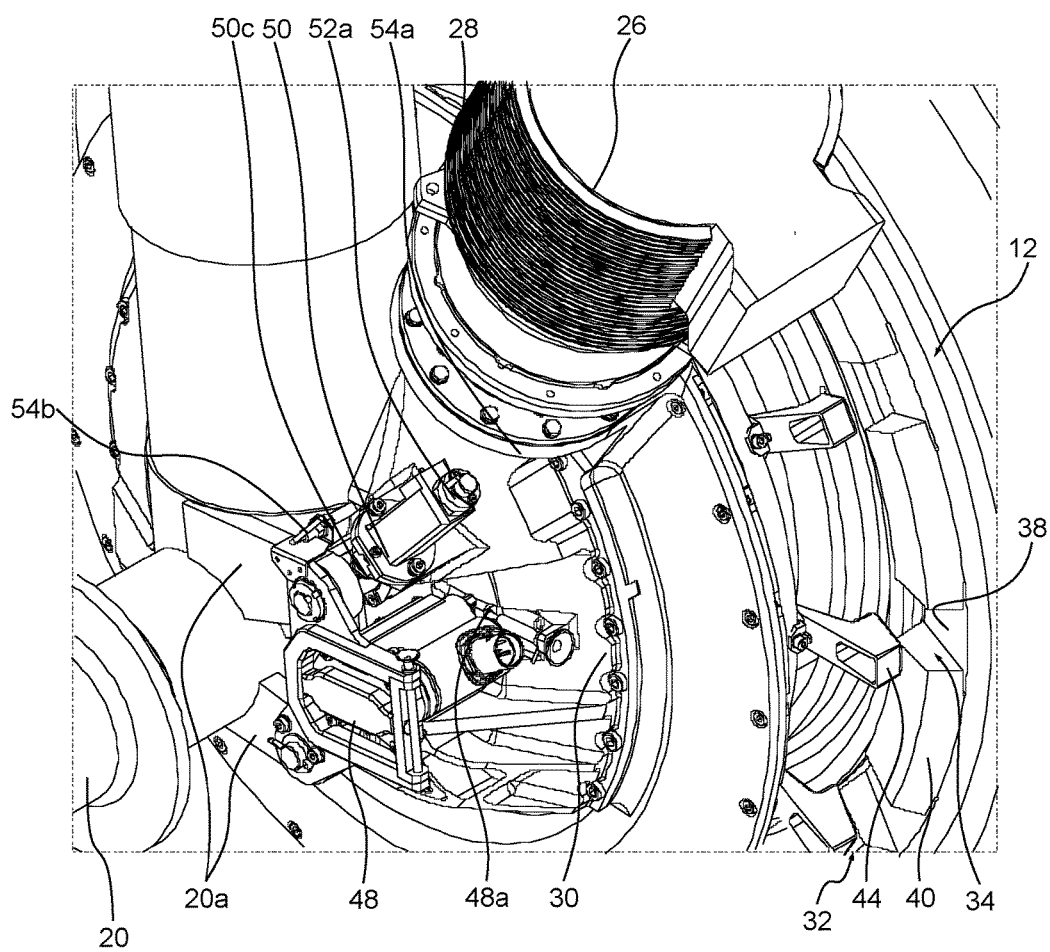
FIG. 6 depicts detail of the clutch device of the wheel drive system according to the invention.

As illustrated in detail in FIG. 6, the system for movement of the clutch device 24 further comprises a remotely actuated electric actuator 48 comprising an actuator rod 48a mounted in a sliding connection in the actuator 48 and one end of which is fixed to the connecting piece 30. The base of the actuator 48 is fixed to two fixing lugs 20a of the axle crossbeam 20. The electric actuator 48 is of known type and will not be described further.

The system for movement of the clutch device 24 comprises two translational-guidance guide pins 50, parallel to one another, each end 50a, 50b of which is fixed to a respective fixing lug 20a of the axle crossbeam 20, the axle crossbeam 20 comprising four fixing lugs 20a.

Figure 7:
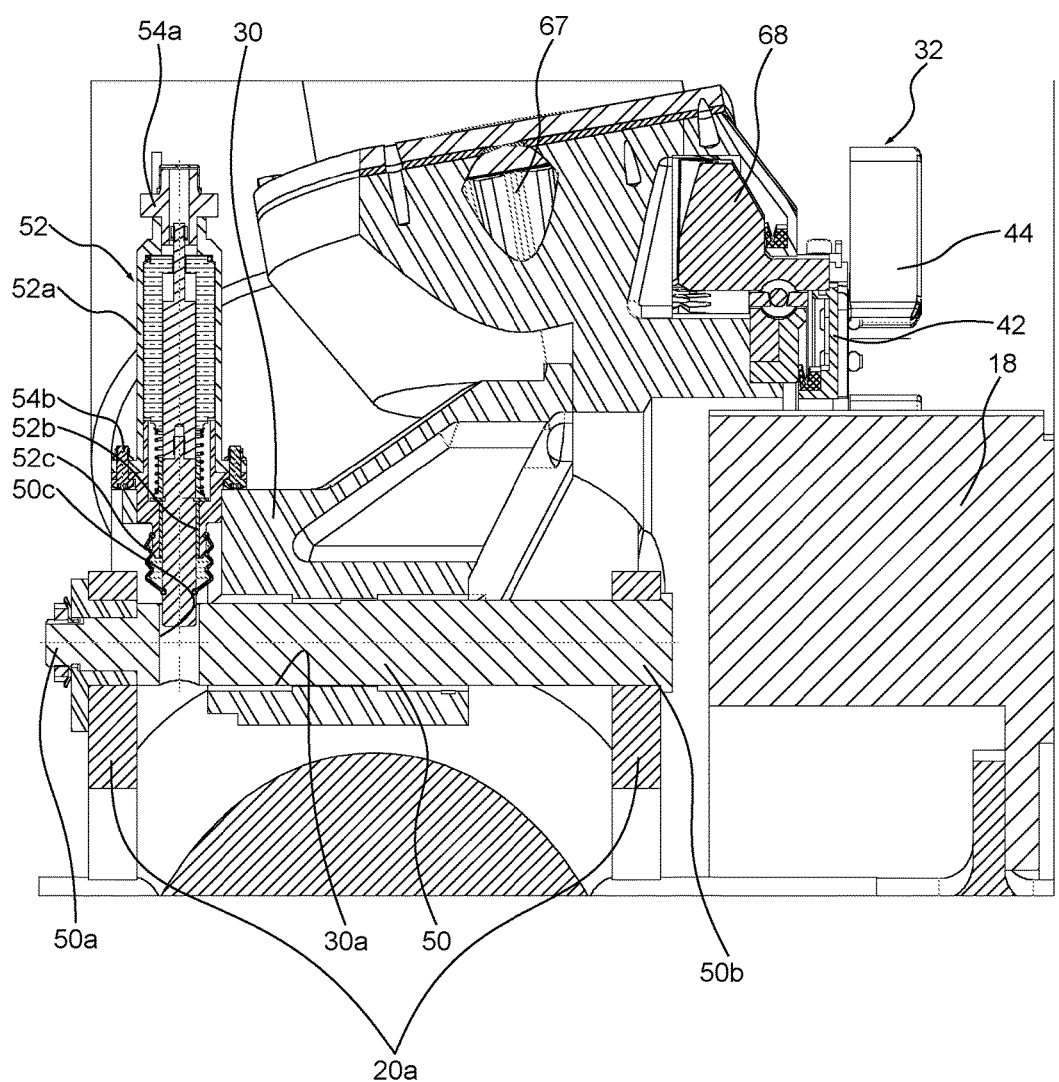
FIGS. 7 and 8 depict views in section VII-VII and VIII-VIII according to FIG. 5 of the clutch device in the disengaged and engaged position.
Figure 8:
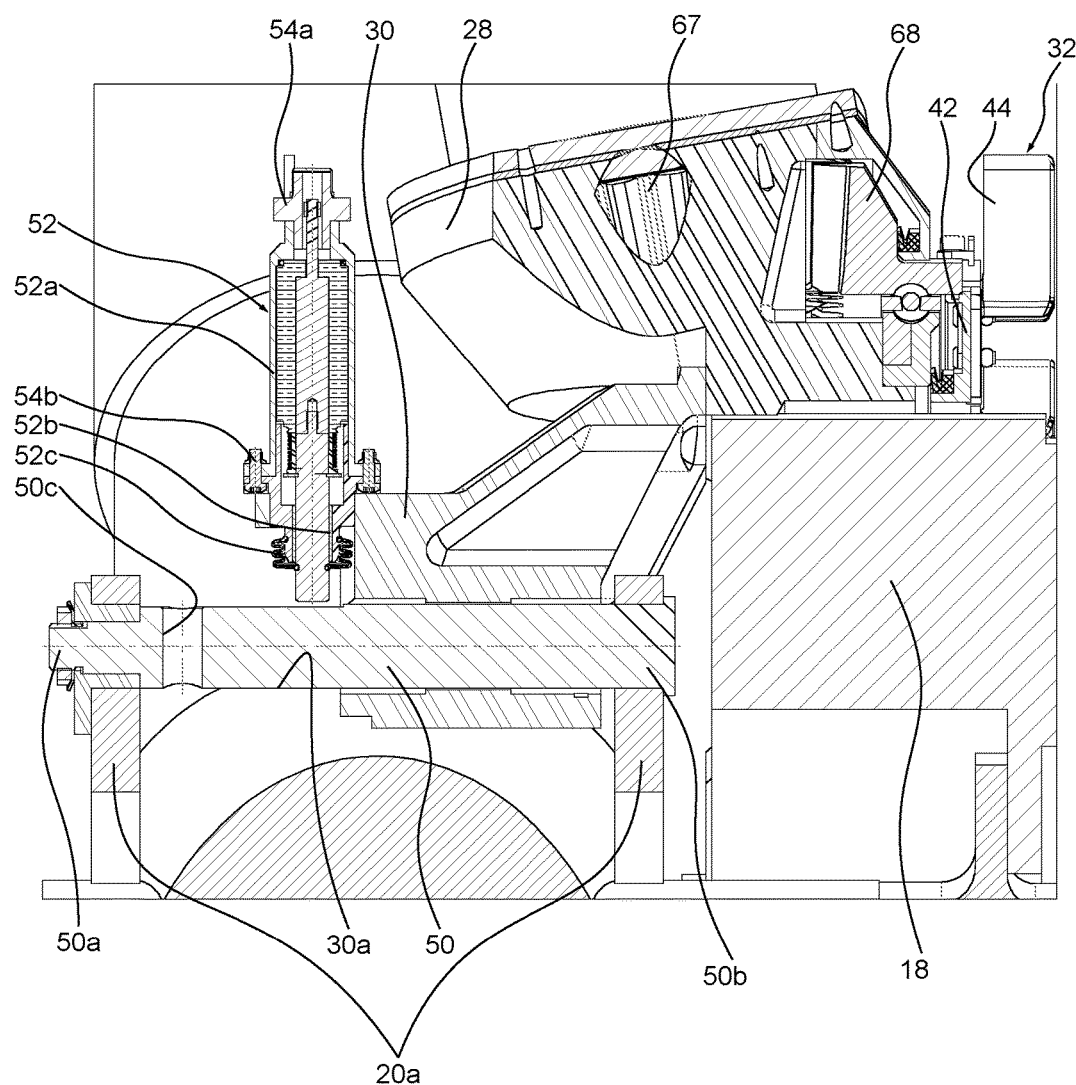

As illustrated in detail in FIGS. 7 and 8, the connecting piece 30 comprises two housings 30a each intended to accept a guide pin 50 between two bearings (unreferenced). Thus, when the actuator rod 48a moves in the direction of the arrow F, the connecting piece 30, which is prevented from rotating by the two guide pins 50, is set in translational motion along the two guide pins 50 and thus forms a sliding connection with the axle crossbeam 20.

Because the drive part 32 is secured to the connecting piece 30 by the motor unit 22, the movement system allows the drive part 32 a translational movement, along the axis of the axle crossbeam 20 of the landing gear strut 14, with respect to the receiving part 34.

The clutch device 24 comprises translational unblocking and blocking means 52 that allows the system for driving the wheel 12 to be kept in a disengaged position. The translational unblocking and blocking means 52 comprise an actuating cylinder 52a secured to the connecting piece 30 and actuated by an electromagnet (unreferenced). One end of the piston 52b of the actuating cylinder is connected to the actuating cylinder body by a compression spring 52c. When the aircraft is not in the taxiing phase, or when there is no longer any electromagnet supply current, the end of the piston 52b is pressed against the exterior surface of the upper guide pin 50. If the system for driving the wheel 12 is in a disengaged position, the end of the piston 52b becomes inserted in a corresponding hole 50c made in the upper guide pin 50. Thus, the connecting piece 30 and, therefore, the drive part 32, cannot move towards the receiving part 34. The mechanism internal to the actuating cylinder 52a will not be described further. As illustrated, a first position detector 54*a* fixed to the actuating cylinder 52*a* makes it possible to ensure that the end of the piston 52*b* is disengaged from the upper guide pin 50, and a second position detector 54*b* fixed to the landing gear 14, for example to a fixing lug 20*a*, makes it possible to confirm that the end of the piston 52*b* is in the disengaged position.

The actuator 48 and the translational blocking and unblocking means 52 may be supplied with electrical power by a power source internal to the aircraft, such as, for example, the electricity produced, for example by the aircraft auxiliary electric generator system or alternatively a battery carried onboard or any other source of power of the aircraft.

During the taxiing phase, the drive part 32 is moved by means of the actuator 48 of the movement system towards the receiving part 34 so as to allow the dog-clutch mechanism to drive the wheel 12 in rotation. The drive to the wheel 12 is therefore completely uncoupled during the phases of take-off, landing and flight.

Figure 9:
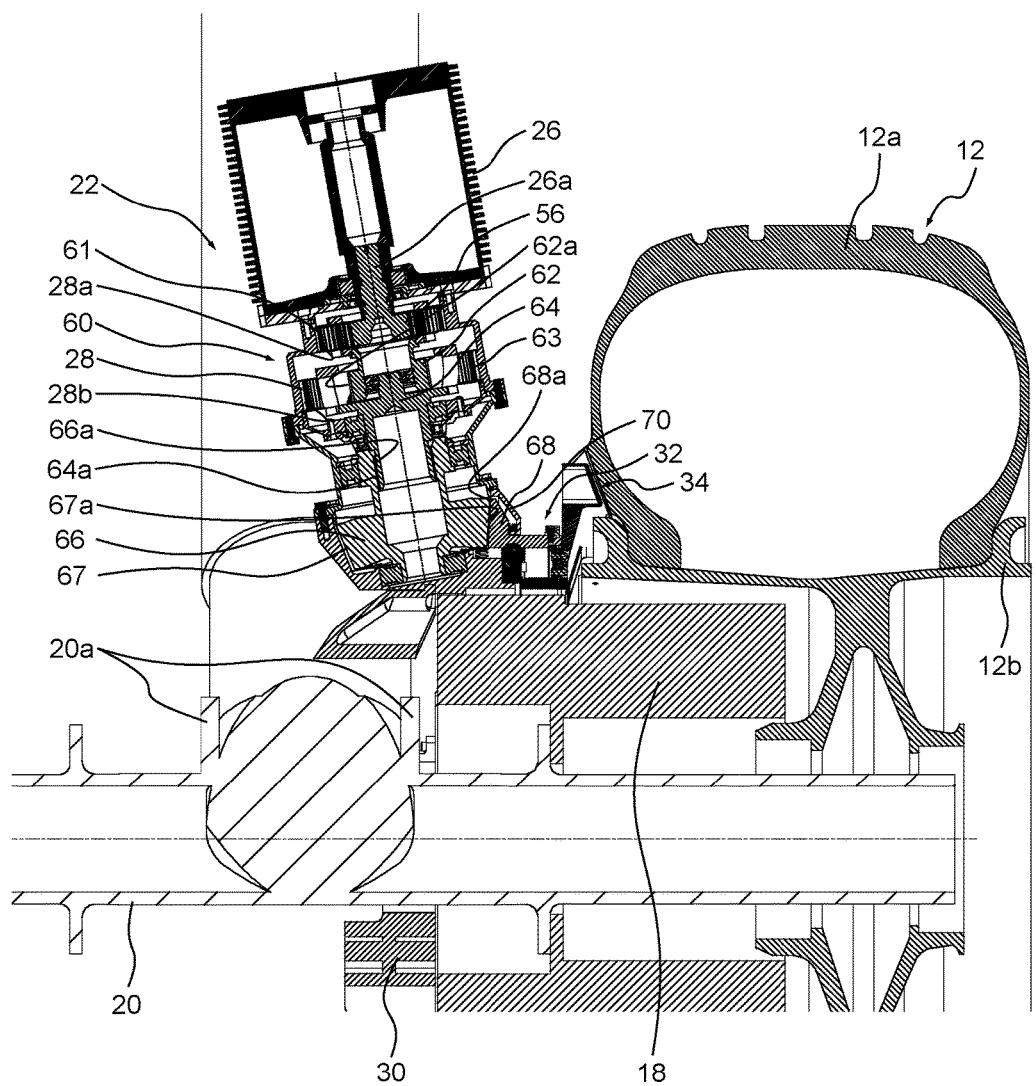
FIG. 9 depicts a view in section IX-IX according to FIG. 5.

As illustrated in detail in FIG. 9, the reduction means comprise a drive pinion 56 connected to the output shaft of the motor 26*a*, meshing with a two-stage planetary reduction gearset 60 rotationally driving a bevel annulus gear by means of a reduction gearset output bevel pinion.

As an alternative, a lower or higher number of reduction stages could be provided between the driving pinion and the output annulus gear of the reduction gearset.

As illustrated, the planetary reduction gearset 60 with two reduction stages comprises a plurality of first planet pinions 61 mounted with the freedom to rotate on spindles (not depicted) the ends of which are secured to opposite grooves of a first planet carrier 62. The first planet pinions 61, of which there are, for example, three, mesh with the drive pinion 56 and a first internal toothset 28*a* formed in the reduction gearbox 28, which is prevented from rotating. As an alternative, an annulus gear could be provided, fixed to the inside of the reduction gearbox and prevented from rotating. Thus, rotation of the drive pinion 56 drives the first planet carrier 62 in rotation.

The planetary reduction gearset 60 further comprises a plurality of second planet pinions 63 with the freedom to rotate on spindles (not depicted) the ends of which are secured to opposite grooves of a second planet carrier 64 mounted with the ability to rotate with respect to the first planet carrier 62 via rolling bearings (unreferenced). The second planet pinions 63, of which there are, for example, three, mesh with a toothset 62*a* of the first planet carrier 62 and a second internal toothset 28*b* formed in the reduction gearbox 28, which is prevented from rotating. As an alternative, an annulus gear could be provided, fixed to the inside of the reduction gearbox. Thus, rotation of the first planet carrier 62 drives the rotation of the second planet carrier 64. The planet pinions 61, 63 comprise, on their periphery, toothsets (unreferenced) which may be straight-cut or helical.

The second planet carrier 64 comprises an external spline 64*a* meshing with an internal spline 66*a* of an output shaft 66 of the reduction gearset mounted to rotate in the reduction gearbox 28 and bearing a reduction gearset output bevel pinion 67. The reduction gearset output bevel pinion 67 meshes with a reduction gearset output bevel annulus gear 68, providing an angular transmission. The bevel annulus gear 68 has a large diameter and is mounted in an annulus gear case 70 via a large-diameter rolling bearing (unreferenced). As illustrated, the connecting piece 30 is fixed to the annulus gear case 70.

As illustrated, the reduction gearset output pinion and annulus gear 67, 68 use bevel toothsets. As an alternative, any similar type of toothset could be employed.

As illustrated, the reduction system is aligned with the motor so that the output shaft of the motor 26*a*, the two planet carriers 62, 64 and the output shaft of the reduction gearset 66 are coaxial. As an alternative, provision could be made for the reduction system not to be aligned with the motor.

The annulus 42 of the drive part 32 of the clutch device 24 is permanently secured to the reduction gearset output bevel annulus gear 68 so that the drive part 32 is rotationally driven by the electric motor 26 via the reduction means. Thus, the clutch device 24 is external to the motor unit 22 because it is connected to the final reduction stage of the reduction means of the motor unit.

One example of how the annulus 42 of the drive part 32 of the clutch device 24 is fixed to the bevel annulus gear 68 is illustrated in FIG. 10. However, it will be noted that any other fixing system that allows the drive part to be attached to the bevel annulus gear of the motor unit may be provided.

As illustrated and entirely nonlimitingly, the annulus 42 comprises a plurality of fixing lugs 42*a* extending radially outwards and arranged in such a way as to leave, between two adjacent lugs, a space for accommodating a pad 68*b* secured to the bevel annulus gear 68. Axial retention of the pad 68*b* in the receiving lugs 42*a* is achieved by an axial retention means 42*b* fixed to the bevel annulus gear 68.

As illustrated in FIG. 9, the braking system 18 associated with each of the wheels 12 is secured to the axle crossbeam 20 and mounted with the ability to rotate via rolling bearings (not depicted) with respect to the rim 12*b* of the associated wheel 12. It will be noted that only the volume allotted to the braking system 18 has been depicted in the figures, which means that the braking system itself is not detailed and will not be described further.

The method for the dog-coupling or engaging of the wheel 12 drive system during the taxiing phase is as follows:

Initially, the drive part 32 of the clutch system 24 is in the rest position, which means to say the disengaged position. This position is maintained by the translational unblocking and blocking means 52.

The coupling fingers 44 of the drive part 32 are set in rotation at a speed that differs slightly from the rotational speed of the wheel 12, which speed may be supplied, for example, by a speed sensor (not depicted). For this purpose, an electronically controlled speed-matching system (not depicted) associated with the clutch device may be provided, allowing control over the rotational speed of the electric motor as a function of the measured rotational speed of the wheel.

The torque of the electric motor 26 is then set to a minimum, then the translational unblocking and blocking means 52 are actuated in order to unlock the drive part 32 from the rest position, which means to say in order to retract the end of the piston 52*b* out of the hole 50*c* made in the upper guide pin 50.

The drive part 32 is moved, via the connecting piece 30, in the direction of the arrow F, towards the receiving part 34 secured to the tire 12*a* using the actuator 48.

As soon as the coupling fingers 44 of the drive part 32 and the shock-absorbing pads 40 of the receiving part 34 come into contact, the force of the actuator 48 becomes increased, which force can be controlled through control of the actuator motor.

Because of the difference between the rotational speed of the wheel and the rotational speed of the drive part, the coupling fingers progressively engage in the square-edged slots of the receiving part. The engaged/coupled position can be detected, for example, by the encoder of the motor of the actuator.

Because of the dog-clutch mechanism, the wheel drive system accommodates deformations between the wheel and the landing gear strut by means of the elastically compressible pads. Engagement/disengagement of the drive part with respect to the receiving part, and absorption of deformation occur at a single point, at the level of the tire.

During phases of flight other than the phases of taxiing and manoeuvring on the ground, the drive and receiving parts of the clutch device are completely separated from one another.

In addition, the drive system can easily be adapted to suit the existing landing gears, with very little modification.

The invention applies advantageously to an aircraft comprising two wheels, just one of which is motorized by the drive system described hereinabove. Provision could be made for each wheel of the landing gear to be provided with a wheel drive system as described hereinabove. Provision could also be made for the aircraft landing gear to comprise, in addition to the pair of motorized wheels, two twinned wheels. The wheel drive system described may also be applied to an aircraft comprising one wheel equipped with the wheel drive system. Specifically, it is possible to motorize only a forward landing gear comprising a single wheel or a pair of wheels, generally referred to as "nose gear". Provision could be made for the said motorized wheel to be steered, namely associated with an orientation system, such as, for example, an electric actuating cylinder.

In the case of an aircraft comprising at least one non-orientable main landing gear and one orientable landing gear, the motorizing of the wheels is preferably performed on at least one of the wheels of the main landing gear. The orientable landing gear may, for example, be a tail wheel the orientation of which may be locked, for example, during the taxiing phase.

The invention claimed is:

1. A wheel drive system for ground movement of an aircraft, the wheel drive system comprising:
    a motor system supported by an unsuspended part of a landing gear strut of the aircraft, the motor system including: (a) an electric motor, and (b) a reduction gearing system; and
    a clutch system, which connects an output shaft of the electric motor to a wheel of the aircraft via the reduction gearing system, the clutch system including: (a) a dog-clutch including (i) a drive part, which is secured to the motor system, and (ii) a receiving part, which is secured to a tire of the wheel, and (b) a translational movement system, which translationally moves the drive part along an axis of an axle crossbeam of the landing gear strut into (i) an engaged position, in which the drive part collaborates with the receiving part, and (ii) a disengaged position, in which the drive part is separated from the receiving part,
    wherein the receiving part includes a plurality of shock-absorbing pads overmolded directly on a lateral sidewall of the tire and extending axially from the lateral sidewall towards the drive part, the plurality of shock-absorbing pads being circumferentially spaced apart so as to leave a square-edged slot between each adjacent pair of the shock-absorbing pads.

2. The wheel drive system according to claim 1, wherein the shock-absorbing pads are made of a rubbery material.

3. The wheel drive system according to claim 2, wherein the shock-absorbing pads are made from a material that differs from a material used to form the tire.

4. The wheel drive system according to claim 1, wherein the drive part includes:
    an annulus fixed to the motor system, and
    a plurality of coupling fingers fixed uniformly around a circumference of the annulus such that, in the engaged position, the coupling fingers engage respectively with the square-edged slots.

5. The wheel drive system according to claim 1, wherein the translational movement system includes a connector secured to the reduction gear system of the motor system, the connector being slidingly mounted on two guide pins secured to the axle crossbeam of the unsuspended part of the landing gear strut.

6. The wheel drive system according to claim 5, wherein the translational movement system further includes:
    an electric actuator fixed to the unsuspended part of the landing gear strut, and
    an actuator rod slidingly connected to the electric actuator, with one end of the actuator rod being fixed to the connector, the translation movement of the actuator rod being translated into a translation movement of the connector along the guide pins.

7. The wheel drive system according to claim 1, wherein the clutch system includes a blocker, which blocks the translational movement system to cause the drive part to be kept in the disengaged position.

8. The wheel drive system according to claim 7, wherein the translational movement system includes a connector secured to the reduction gear system of the motor system, the connector being slidingly mounted on two guide pins secured to the axle crossbeam of the unsuspended part of the landing gear strut, and
    wherein the blocker includes an actuating cylinder secured to the connector, the actuating cylinder including an electromagnetically actuatable piston comprising (a) a first end connected to a body of the actuating cylinder by a compression spring and (b) a second end that engages in a corresponding housing on one of the guide pins when in the disengaged position.

9. The wheel drive system according to claim 1, wherein the reduction gearing system includes:
    a drive pinion connected to the output shaft of the electric motor, and
    a planetary reduction gearset rotationally driven by the drive pinion and arranged to drive a reduction gearset output bevel annulus gear via a reduction gearset output bevel pinion.

10. The wheel drive system according to claim 9, wherein the drive part of the dog-clutch is fixed to the reduction gearset output bevel annulus gear.

11. The wheel drive system according to claim 9, wherein the planetary reduction gearset includes at least two reduction stages.

12. The wheel drive system according to claim 1, wherein the wheel drive system is incorporated in the aircraft.

13. An aircraft comprising:
    (a) a wheel;
    (b) a landing gear strut; and
    (c) a wheel drive system for ground movement of the aircraft, the wheel drive system including: (1) a motor system supported by an unsuspended part of the landing gear strut, the motor system including: (a) an electric motor, and (b) a reduction gearing system, and (2) a clutch system, which connects an output shaft of the electric motor to the wheel via the reduction gearing system, the clutch system including: (a) a dog-clutch including (i) a drive part, which is secured to the motor system, and (ii) a receiving part, which secures is secured to a tire of the wheel, and (b) a translational movement system, which translationally moves the drive part along an axis of an axle crossbeam of the landing gear strut into (i) an engaged position, in which the drive part collaborates with the receiving part, and (ii) a disengaged position, in which the drive part is separated from the receiving part, wherein the receiving part includes a plurality of shock-absorbing pads overmolded directly on a lateral sidewall of the tire and extending axially towards from the lateral sidewall towards the drive part, the plurality of shock-absorbing pads being circumferentially spaced apart so as to leave a square-edged slot between each adjacent pair of the shock-absorbing pads.

14. The aircraft according to claim 13, further comprising a landing gear system that includes the landing gear strut and a pair of wheels, the pair of wheels including the wheel and a second wheel, wherein (1) the wheel and the second wheel share the wheel drive system or (2) the second wheel is separately equipped with its own wheel drive system.

\* \* \* \* \*